US009251499B2

(12) United States Patent
Cohen

(10) Patent No.: US 9,251,499 B2
(45) Date of Patent: Feb. 2, 2016

(54) SYSTEM, METHOD, AND APPARATUS FOR PRESERVATION OF ACCESSIBILITY AND SERVICEABILITY INFORMATION

(75) Inventor: Aaron M. Cohen, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/752,306

(22) Filed: Apr. 1, 2010

(65) Prior Publication Data

US 2011/0246924 A1 Oct. 6, 2011

(51) Int. Cl.
*G06F 3/048* (2013.01)
*G06Q 10/10* (2012.01)
*G06F 9/44* (2006.01)

(52) U.S. Cl.
CPC .............. *G06Q 10/10* (2013.01); *G06F 9/4446* (2013.01)

(58) Field of Classification Search
CPC .................................................... G06F 9/4446
USPC ......... 715/772, 865, 711, 714, 746, 762, 803, 715/805; 719/318
See application file for complete search history.

(56) References Cited

U.S. PATENT DOCUMENTS

| 6,725,424 B1* | 4/2004 | Schwerdtfeger et al. ..... 715/239 |
| 2004/0250214 A1 | 12/2004 | McGlinchey et al. |
| 2005/0060719 A1 | 3/2005 | Gray et al. |
| 2005/0210056 A1* | 9/2005 | Pomerantz et al. ........... 707/101 |
| 2006/0161856 A1* | 7/2006 | Heir .............................. 715/769 |
| 2006/0184410 A1 | 8/2006 | Ramamurthy et al. |
| 2008/0104528 A1* | 5/2008 | Logan et al. ................... 715/764 |
| 2008/0301101 A1* | 12/2008 | Baratto et al. ................. 715/704 |
| 2009/0287962 A1* | 11/2009 | Bakekolo et al. ............... 714/38 |
| 2010/0115334 A1* | 5/2010 | Malleck .................. G06F 9/485 714/15 |
| 2010/0229112 A1* | 9/2010 | Ergan .................. G06F 3/04895 715/764 |
| 2011/0264709 A1* | 10/2011 | Beardsmore et al. ......... 707/804 |

FOREIGN PATENT DOCUMENTS

WO WO 2007122145 A1 * 11/2007

* cited by examiner

*Primary Examiner* — Dino Kujundzic
(74) *Attorney, Agent, or Firm* — Jeffrey T. Holman

(57) ABSTRACT

A computing device is configured to capture accessibility information for remote technical support diagnostics. The computing device includes a computer display, a data storage device, and a communication interface. The computer display displays an application window for an application program. The data storage device stores an image and corresponding accessibility context information. The image is a screen shot of display content, including the application window, on the computer display. The accessibility context information describes an accessibility parameter associated with the application window depicted within the image. The communication interface transmits the image and the associated accessibility context information to a remote user in response to a request from the remote user.

10 Claims, 7 Drawing Sheets

SYSTEM, METHOD, AND APPARATUS FOR PRESERVATION OF ACCESSIBILITY AND SERVICEABILITY INFORMATION

BACKGROUND

The internet has made it possible to offer technical support services from remote locations. There are many ways to provide technical services remotely. For example, a user of a computer (or other device) may call technical support staff and discuss the problem over the telephone. As another example, the user may send an email or instant message to the technical support staff. As another example, the user may authorize the technical support staff to remotely control the user's computer (or other device).

In situations where remote access to a user's computer is not possible, the user may send (e.g., via email) an image (i.e., a screen shot) of the information displayed on the user's screen to the support provider so that the support provider can reference the exact information depicted on the user's screen. However, a visual snapshot of the user's desktop content does not include the accessibility context information (i.e., information that can be used to convey information to a person with a physical disability or impairment) that is associated with various application windows depicted in the desktop content.

Thus, a conventional support service approach may be essentially useless to a support provider who is visually impaired. This makes the screenshot image useless, in this scenario. Additionally, conventional technical support services which use images to identify desktop content in an off-line manner may conflict with statutory or regulatory requirements to accommodate people with physical disabilities or impairments.

SUMMARY

Embodiments of a computer program product are described. In one embodiment, the computer program product includes a computer useable storage medium to store a computer readable program for capturing accessibility information. In some embodiments, the accessibility information may be sent to a remote user for remote technical support diagnostics. The computer readable program, when executed on a computer, causes the computer to perform operations. The operations include storing an image within a data storage device. The image includes a screen shot of display content on a computer display. The operations also include storing a location identifier within the data storage device in connection with the image. The location identifier identifies a location of an application window depicted within the image. The operations also include storing accessibility context information within the data storage device in connection with the image. The accessibility context information describes an accessibility parameter associated with the application window depicted within the image. Other embodiments of computer program products, computing devices, and corresponding methods are also described. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
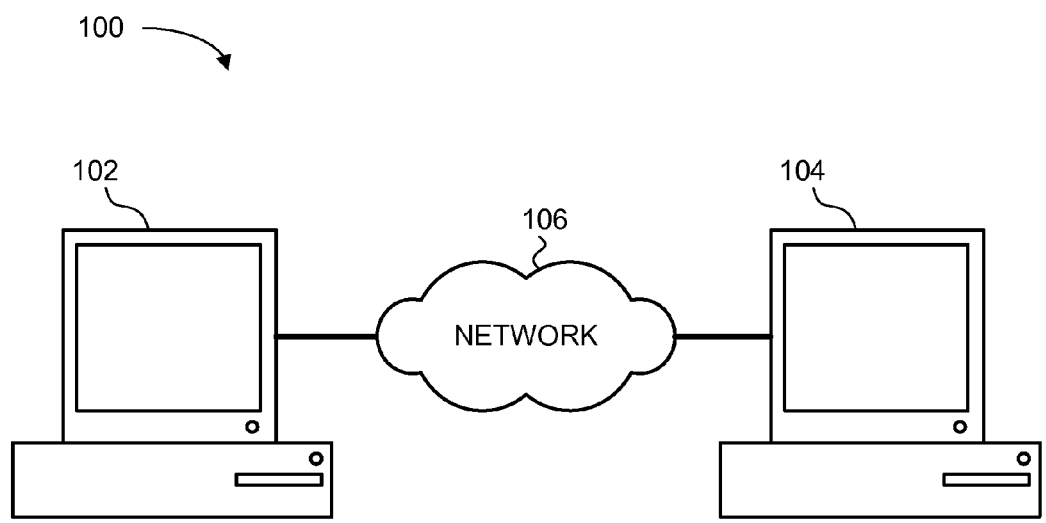
FIG. 1 depicts a schematic block diagram of one embodiment of a communication system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate capturing and using accessibility context information in remote, off-line diagnostics. Although not limiting in all embodiments, the term "remote" conveys a physical and/or logical relationship between two computing devices that are not directly coupled to one another, even though they independently may be coupled to one or more intermediate networks or communication channels. One example of remote computers involves two computers that are each connected to the internet, but are not connected to each other directly. Also, although not limiting in all embodiments, the term "off-line" indicates that there is not a synchronous, real-time connection between two devices, even though there may be functionality in place to perform asynchronous communications via, for example, the internet.

In one embodiment, separate capture and display mechanisms are implemented on separate computers that are located remotely with respect to each other. The capture mechanism is implemented on a first computer to capture a screen shot of display content, including some or all of the visual objects displayed on the virtual desktop of the computer. The capture mechanism also obtains accessibility context information for one or more of the visual objects. The capture mechanism also obtains serviceability context information (i.e., resource information) that is descriptive of the state or usage of resources that are available to the applications/processes corresponding to the visual objects. Some examples of resources include memory usage, processor usage, bus usage, and so forth.

In one embodiment, the display mechanism is implemented on a second computer. In general, the captured information is communicated from the first computer to the second computer so that the second computer can display and/or communicate at least some of the captured information to a user at the second computer. In a specific embodiment, the display mechanism displays the screenshot to the user and sets accessibility text of the image based on the location of a selection indicator (e.g., a cursor or a tab index). In some embodiments, the display mechanism also overlays at least some of the serviceability information, or representations thereof, on top of or in alignment with the corresponding applications represented in the screenshot.

An advantage of at least one embodiment described herein is that the accessibility and serviceability information is accessible in an off-line form, so that a live (i.e., real time) connection to the remote user's computer is not required. Additionally other components can be built on top of this solution to allow for additional correlation between what is visually available in the screenshot and other sources of information (e.g., tech-notes, error code pages, other screenshots, etc.).

FIG. 1 depicts a schematic block diagram of one embodiment of communication system 100. Although the communication system 100 is shown and described with certain components and functionality, other embodiments of the communication system 100 may include fewer or more components to implement less or more functionality.

The illustrated communication system 100 includes multiple nodes 102 and 104 connected together via a computer communication network 106. The network 106 may be an intranet, the internet, a local area network (LAN), a wide area network (WAN), a cellular network, or another type of network, or a combination of different types of networks. It should also be noted that the communication system 100 may include more than two nodes.

In some instances, the nodes 102 and 104 are also referred to as client computers 102 and 104. Each of the nodes 102 and 104 may be referred to as a sending node and/or a receiving node, depending on the direction of data flow between the nodes 102 and 104 at any given time. For reference in the descriptions herein, the first node 102 is referred to as a client computer 102 for use by a user who seeks technical support for an application program implemented on the client computer 102. The second node 104 is referred to as a support computer 104 for use by a support provider who provides technical support to the user for the application program installed on the client computer 102. In a more specific embodiment, the support computer 104 is operated by a person who has a physical disability or impairment and, hence, may use accessibility functionality to help convey information to the user. Some examples of conventional accessibility functionality include a magnifier to enlarge the view of a portion of the display content, a narrator to speak words within the display content, an on-screen keyboard for mobility-impaired users, or another type accessibility functionality.

Figure 2:
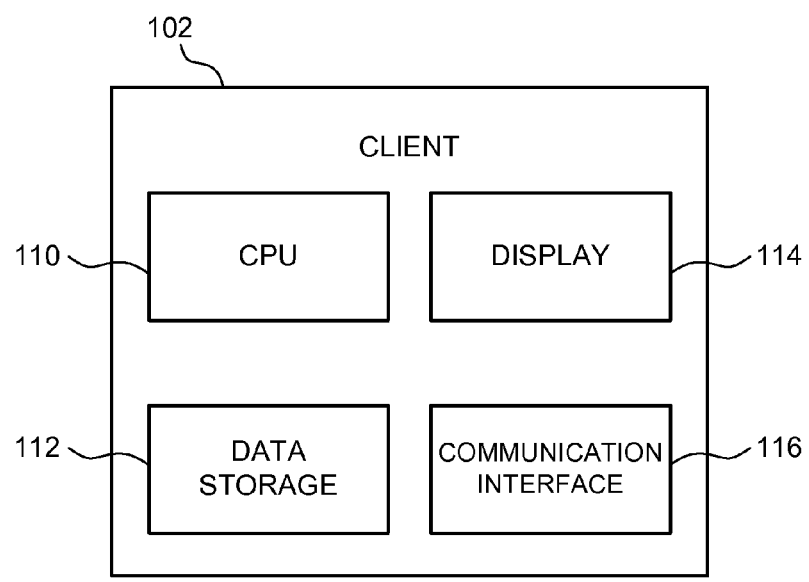
FIG. 2 depicts a schematic block diagram of one embodiment of a client computer for use in the communication system of FIG. 1.

FIG. 2 depicts a schematic block diagram of one embodiment of a client computer 102 for use in the communication system 100 of FIG. 1. Although the client computer 102 is shown and described with certain components and functionality, other embodiments of the client computer 102 may include fewer or more components to implement less or more functionality. For example, some embodiments may include internal communication buses, input/output (I/O) peripherals, and so forth.

The illustrated client computer 102 includes a central processing unit (CPU) 110, a data storage device 112, a display device 114, and a communication interface 116. In general, the CPU 110 includes one or more processing units, in any configuration, to process instructions on the client computer 102. More specifically, the CPU 110 may process instructions to implement one or more application programs through which a user can interact with the client computer 102.

Figure 3:
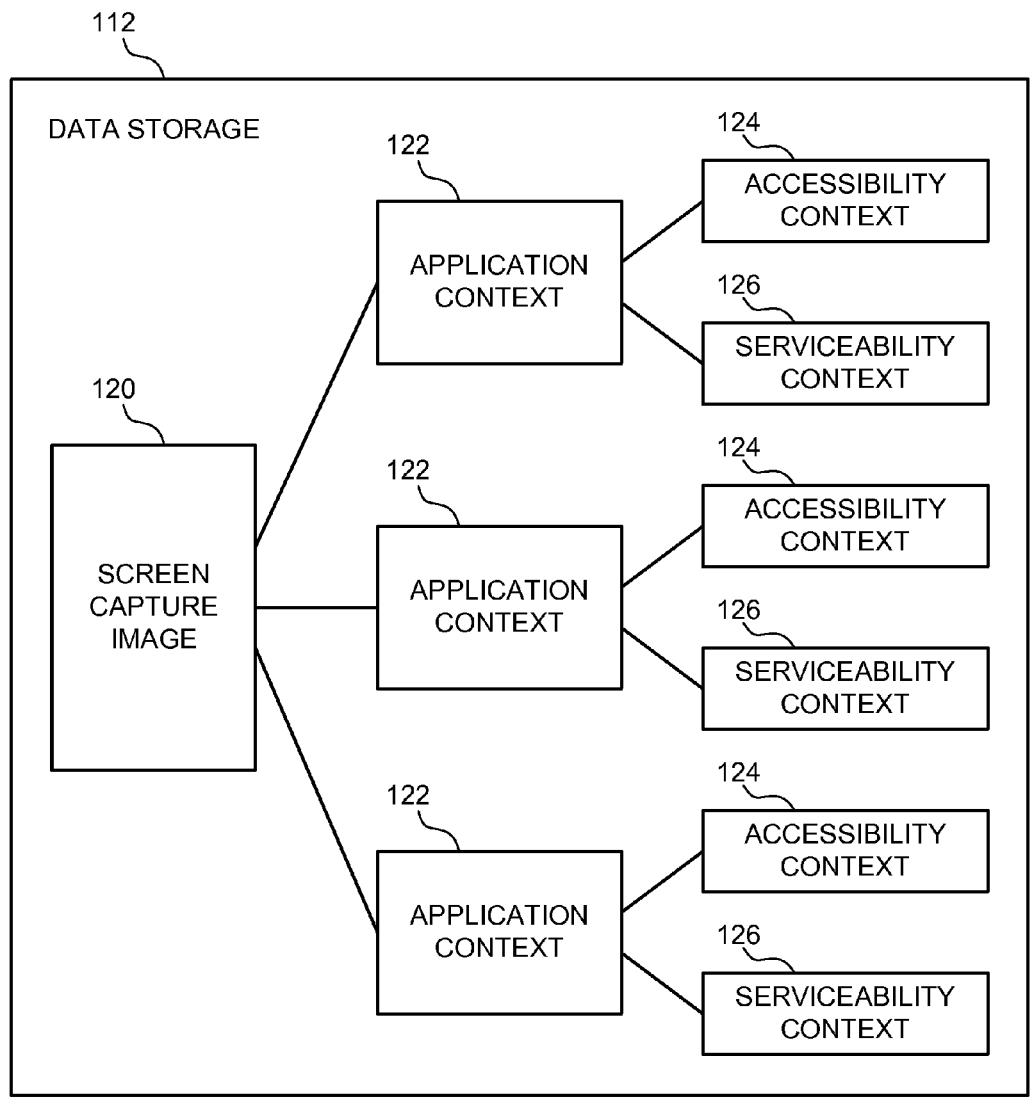
FIG. 3 depicts a schematic diagram of one embodiment of the data storage device of the client computer shown in FIG. 2.

The data storage device 112 stores software instructions and/or other data that may be used by the CPU 110. The data storage device 112 is representative of at least one type of computer readable storage medium. The data storage device 112 may be any type of storage or memory device such as any of the following: volatile and non-volatile media, removable and non-removable media, random access memory (RAM), read-only memory (ROM), electrically erasable programmable ROM (EEPROM), flash memory, and any other type of internal or external data storage media. At least a portion of the data storage device 112 contains rewriteable memory so that information can be written to the data storage device by the CPU 110 or other components within the client computer 102. The data storage device 112 also stores instructions for a computer readable program to implement one or more application programs on the client computer 102. Additionally, the data storage device 112 may store instructions for displaying information on the display device 114. A specific example of one embodiment of the data storage device 112 is shown in FIG. 3 and described in more detail below.

Figure 4:
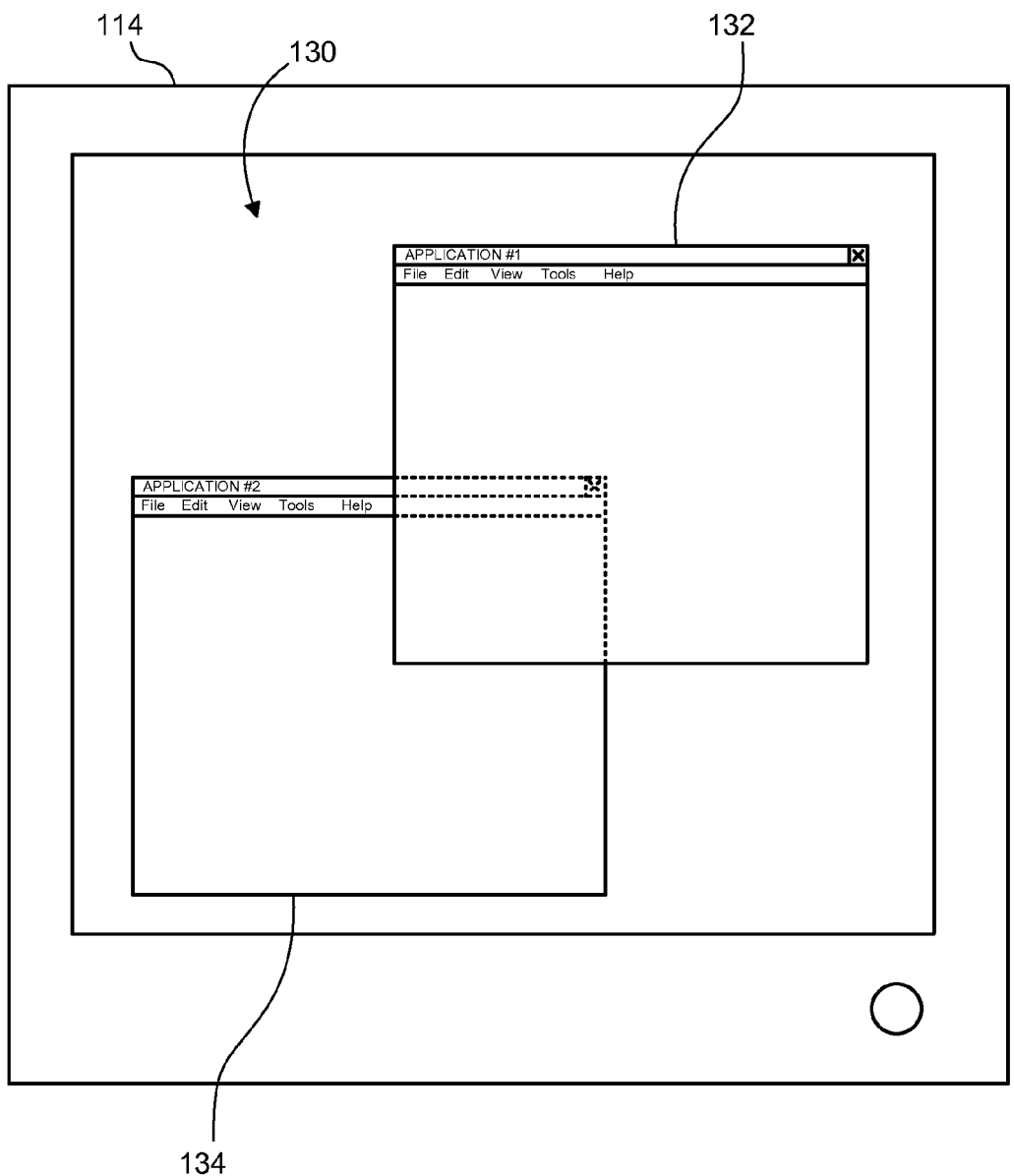
FIG. 4 depicts a schematic diagram of one embodiment of the display device of the client computer shown in FIG. 2.

The display device 114 may be any type of graphical display such as a cathode ray tube (CRT) monitor, a liquid crystal display (LCD) monitor, or another type of display device. In some embodiments, the display device 114 displays a graphical user interface (GUI) for one or more application programs implemented by the CPU 110. A specific example of one embodiment of the display device 114 is shown in FIG. 4 and described in more detail below.

The communication interface 116 generally facilitates communications with other computer devices (e.g., the support computer 104 shown in FIG. 1) through a networking infrastructure. In one embodiment, the communication interface 116 includes a modem. In another embodiment, the communication interface 116 includes a network interface card (NIC). Other embodiments may use other types of communication interfaces or a combination of different communication interfaces.

By storing and executing certain software programs on the client computer 102, the client computer 102 can facilitate capturing, storing, and associating accessibility data with screenshot images from the display device 114. The captured images include graphical representations of one or more GUIs for one or more application programs that are operating on the client computer 102. The captured accessibility data corresponds to the various application programs and/or to the operating system that is executing on the client computer 102. Serviceability data corresponding to the various application programs and/or to the operating system can also be captured and stored in association with the images.

The captured images and corresponding accessibility and serviceability data can then be transmitted via the communication interface 116 to a remote computer such as the support computer 104 for viewing and review. By sending the accessibility data with the images and the serviceability data, the remote computer can display the images and use the accessibility data to provide an enhanced method for communicating the serviceability data to a user. This process can be particularly helpful in situations in which a person with a disability or impairment benefits from the enhanced communication of the serviceability data according to the provided accessibility data. Also, providing the accessibility data with the images and the serviceability data in this manner allows a remote user to access the serviceability data according to the serviceability data even if there is not an ongoing connection between the client computer 102 and the support computer 104 (i.e., the client computer 102 and/or the support computer 104 is offline).

FIG. 3 depicts a schematic diagram of one embodiment of the data storage device 112 of the client computer 102 shown in FIG. 2. The illustrated data storage device 112 stores a screen capture image 120 and one or more application contexts 122. Each application context 122 corresponds to a specific application program operating on the client computer 102 and represented within the screen capture image 120. It should be noted, however, that the application program does not necessarily have to be visible within the screen capture image 120. The application context 122 can be stored for all application programs, regardless of whether or not the corresponding GUI might be visible within the screen capture image 120. In many instances, several application programs may be operating on the client computer 102, but less than all of the application programs are visible within the screen capture image 120. This scenario can occur, for example, where the GUI for one application program is "behind" the GUI for another application, within the view displayed on the display device 114.

In one embodiment, the application context 122 for each application program operating on the client computer 102 includes information that is descriptive of the corresponding application program. In some embodiments, the application context 122 stores information to indicate a location of the corresponding GUI within the image 120. As an example, the application context 122 for an application program with a rectangular GUI may include 1) an origin point to indicate a position of one corner of the GUI, and 2) a window size to indicate the width and height of the GUI. Other GUI configurations may be represented by other types of location identifiers. Additionally, the application context 122 may include other contextual information for the corresponding application program. For example, the application context 122 may include object type information to indicate a type of object (e.g., button, text box, etc.) referenced or shown within the GUI. In another embodiment, the data storage device 112 also stores an operating system context (not shown) with contextual information descriptive of one or more parameters of the operating system.

In addition to the application context 122 for a particular application program, the data storage device 112 also stores associated accessibility context information 124 and serviceability context information 126. In one embodiment, the accessibility context information 124 describes an accessibility parameter associated with the application window depicted within the image 120. Additionally, the accessibility context information 124 includes information associated with the application window (GUI) for communication to a person with a physical disability. In one embodiment, the serviceability context information 126 describes a serviceability parameter associated with the application window depicted within the image. Additionally, the serviceability context information 126 includes information associated with the application window (GUI) for resource allocation of a computing resource. For example, the serviceability context information 126 may include a memory usage indicator to indicate the amount of memory that is used by the corresponding application program. As another example, the serviceability context information 126 may include a processor usage indicator to indicate the amount of processor capacity that is used by the corresponding application program. Other embodiments of the serviceability context information 126 may include other information that is descriptive of the resources used by the corresponding application program.

While there are potentially many ways to capture accessibility context information 124, one example is described herein for reference. In one embodiment, the "at-spi" library available under Linux is used. However, other embodiments may use IAccessible under Windows or NSAccessible under MacOSX 10.2 or later. No matter the platform, the algorithms that might be used may be nearly the same. Under Windows and Linux, the accessibility context information 124 could be captured using the following operations:

1. Start with the accessibility interface for the desktop object;
2. Iterate through all of the children of that object and their children;
3. Identify:
    a. The position and size of the object;
    b. The type of object (window, text, etc.);
    c. The Z position (relative to other windows); and
    d. Other attributes specific to the object such as the value for the text object; and
4. Store the information in a data structure stored in a string.

These operations may be slightly different under MacOSX. However, in many embodiments, the general operations will iterate through the objects on the virtual desktop. Other embodiments may be implemented using fewer or more operations in the same or a different order.

While there are potentially many ways to capture serviceability context information 126, one example is described herein for reference. In one embodiment, the "/proc" directory is iterated through to gather system information (e.g., the application context 122) on each application. This may include memory usage, CPU usage, and/or any system information or log that can be associated with the corresponding application.

Additionally, it should be noted that the screen capture image 120, the application context 122, the accessibility context information 124, and the serviceability context information 126 may be stored in various forms of data structures within the data storage device 112. In one embodiment, separate data structures are used to store separate types of information, in which case the separate data structures may be linked together, or a separate table (not shown) may be used to create a correlation among the separate data structures. In another embodiment, two or more types of information are stored in a single data structure. For example, the accessibility context information 124 and the serviceability context information 126 may be stored in a single data structure. In one embodiment, the accessibility context information 124 and the serviceability context information 126 may be stored as metadata within the corresponding image 120. Other embodiments may use other types of data structures to indicate relationships among the various types of data corresponding to a particular image 120.

One example of a data structure is provided herein for reference, although other embodiments may use other data structures or other formats within a similar data structure. In this example, the name of the process is correlated with the name of the accessible application together in a JSON string. In one embodiment, a snippet of the string includes:

```
Desktops:[
{
width: 1600,
height:1450,
Applications:[
{
name : gnome-terminal,
x : 348,
y : 204,
z : 1,
width : 902,
height: 204,
cpu: 0,
mem: 1,
children: [
...
]
}
...
]
}]
```

As mentioned above, the JSON string and the screenshot image 120 may be kept in two separate files, but the JSON string could be stored in the metadata of the image 120, depending on the image format that is used. Although this example uses a JSON format, other embodiments could use an extensible markup language (XML) or another standard format for storing data.

FIG. 4 depicts a schematic diagram of one embodiment of the display device 114 of the client computer 102 shown in FIG. 2. In the illustrate embodiments, the display device 114 includes a viewing area 130 to display a virtual desktop for a user. The virtual desktop is often referred to simply as the screen. Thus, a screenshot of the virtual desktop includes an image of the display content that is displayed within the viewing area 130.

In the depicted embodiment, two GUI application windows 132 and 134 are located within the viewing area 130. The windows 132 and 134 are partially overlapping, although the windows 132 and 134 may fully overlap (so that one is hidden behind the other) or may be non-overlapping.

When an image 120 of the display content within the viewing area 130 is stored in the data storage device 112, the stored data is representative of the individual pixels, or groups of pixels, that are used to generate the viewable windows 132 and 134. The image 120 may be stored in any acceptable graphical file format. Also, the application context 122, the accessibility context information 124, and the serviceability context information 126 for the corresponding application windows 132 and 134 are also captured and saved in association with the image 120.

Figure 5:
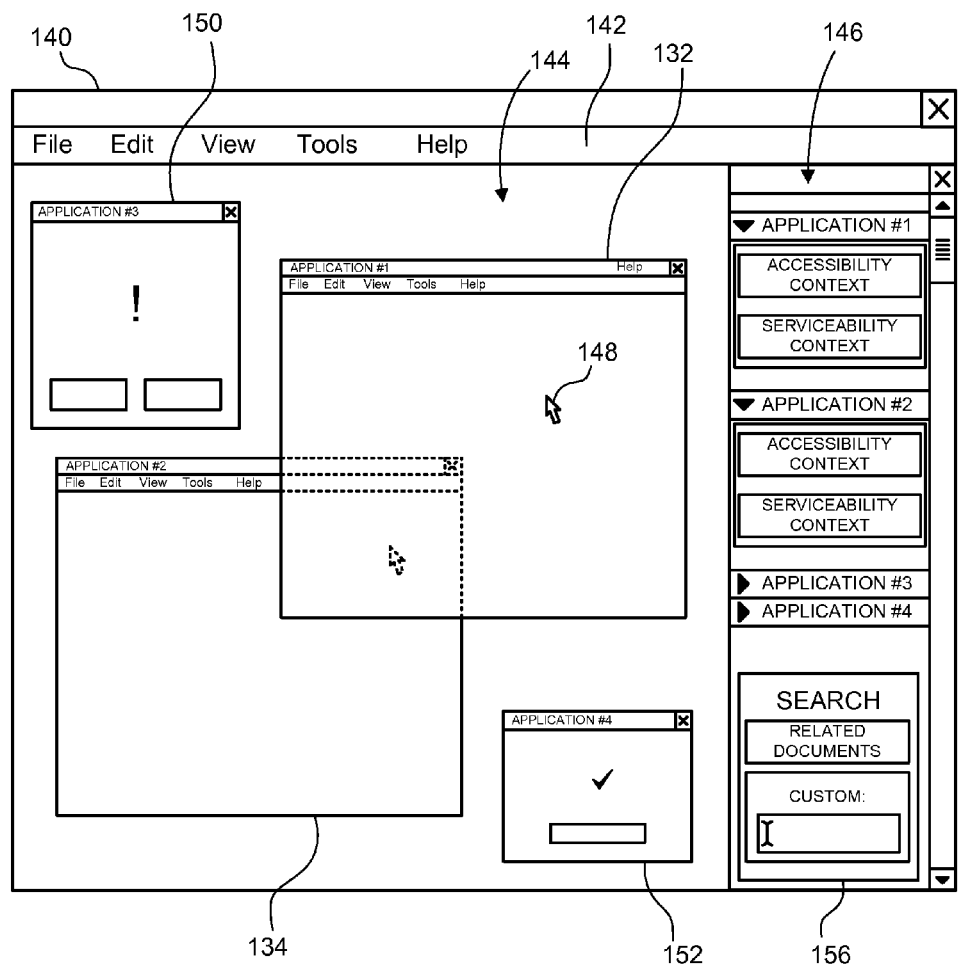
FIG. 5 depicts a schematic diagram of one embodiment of a display window of a remote viewing computer for remotely displaying the image and communicating the serviceability context information according to the accessibility context information.

FIG. 5 depicts a schematic diagram of one embodiment of a display window 140 of a remote viewing computer for remotely displaying the image 120 and communicating the serviceability context information 126 according to the accessibility context information 124. In general, an embodiment of the display mechanism (e.g. display window 140) serves multiple functions. In one embodiment, the display mechanism displays the screenshot image 120 and sets the image's accessibility context based on the cursor location and/or tab index. In another embodiment, the display mechanism allows correlation among additional information about the application/process in the image 120. This correlation may be done by both appending the accessibility context with that information and displaying a visual layer on top of the image.

As one example, the support computer 104 shown in FIG. 1 serves as the remote viewing computer to remotely view an image 120 captured from the client computer 102. The display window 140 generally serves as a viewing interface. The illustrated display window 140 includes a menu bar 142 that shows possible menu selections within the viewing interface. The display window 140 also includes a viewing area 144 to display the captured and transmitted image 120 to a user. The display window 140 also includes an information area 146 to convey information such as the accessibility context information 124 and/or the serviceability context information 126 to the user. In some embodiments, the serviceability context information 126 is conveyed to the user according to the accessibility context information 124. In the illustrated embodiment, the accessibility context information 124 and the serviceability context information 126 are listed by application in the information area 146 using expandable selections or other similar functionality.

The viewing area of the display window 140 displays the image 120 and, in some embodiments, also displays indications related to the serviceability context information 126. As a selection indicator 148 indicates a selection of a particular application window (e.g., window 132), the specific serviceability context information 126 for the selected application window may be emphasized or otherwise given priority for communication to the user. In some embodiments, the serviceability context information 126 for the selected application window is automatically conveyed to the user. In one embodiment, the selection indicator 148 is a cursor marker such as a mouse pointer. In another embodiment, the selection indicator 148 is a tab index that indicates a selected window based on the number of times the "tab" button is pressed (causing the tab index to "scroll" through the available application windows.

Additionally, the display window 140 may automatically provide other indications related to serviceability context information 126 of the application windows, regardless of the position or state of the selection indicator 148. In the illustrated embodiment, the window 150 includes an exclamation mark ("!") overlaid on top of the corresponding GUI. Similarly, the window 152 includes a check mark overlaid on top of the corresponding GUI. Different symbols or indicators may have different meanings.

Also, in some embodiments, the display window 140 automatically identifies the user if more than one application window might be selected by the selection indicator 148. For example, if the selection indicator 148 is a cursor, and the cursor is positioned in alignment with more than one application window (because the windows partially or wholly overlap such as the bottom left corner of window 132 and the top right corner of window 134), then the display window 140 may emphasize or communicate the serviceability context information 126 for both of the potentially selected windows 132 and 134.

The illustrated embodiment also includes a search function 156 that may be located within the information area 146. The search function 156 may be available to search for related documents based on the content in the image 120. This means that the user could locate the selection indicator 148 over a dialog window in the image 150 (or over corresponding information in the information window 146) and the application automatically searches for relative documentation (e.g., tech notes, white papers, etc. . . . ). The search may be implemented based on one or more of the following:

1. The text in the dialog window;
2. The type of components;
3. The parent windows of the dialog window;
4. The application that launched the dialog window; and
5. Other windows open in the desktop;

Essentially, an embodiment of the search function 156 finds content based on the visual components on the desktop and/or the associated serviceability context information 126.

Figure 6:
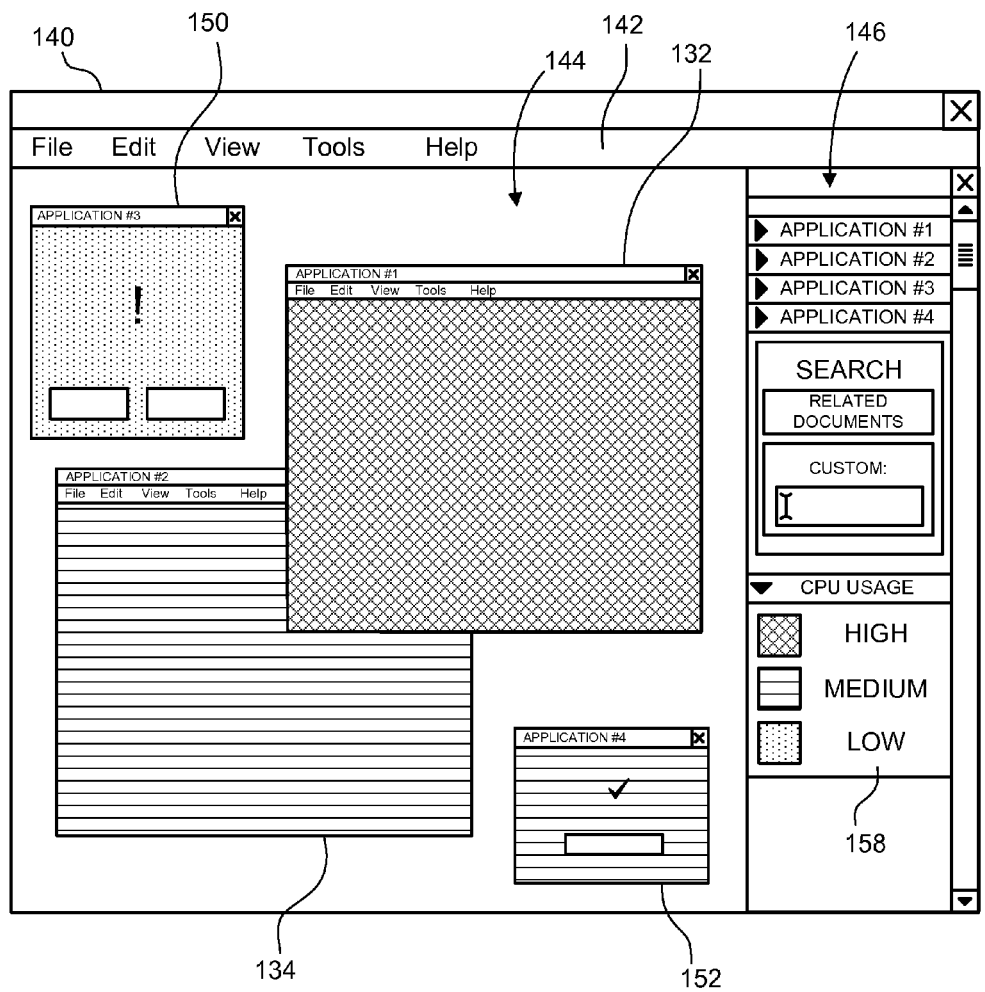
FIG. 6 depicts a schematic diagram of another embodiment of the display window of the remote viewing computer of FIG. 5.

FIG. 6 depicts a schematic diagram of another embodiment of the display window 140 of the remote viewing computer of FIG. 5. While many aspects of the display window 140 of FIG. 6 are similar to the display window 140 of FIG. 5, the display window 140 of FIG. 6 uses different types of visual indicators. Instead of using symbols (e.g., an exclamation point or a check mark), the additional visual layer overlaid on top of the image 120 may display an opaque or partially transparent color area over each application to indicate resource usage such as heavy CPU usage, memory usage, or another measurable resource usage such as strong activity in an associated log. As one example, an application with a blue tint is not using a lot of CPU cycles, but an application with a red tint is using a lot of CPU cycles. Alternatively, patterns may be used instead of, or in addition to, colors. Other embodiments may use other types of indicators. Further, other embodiments may combine two or more types of indicators for the same or different resources. For example, the windows 150 and 152 are each emphasized by a pattern and a symbol. A legend 158 may be provided for the various types of indicators.

Figure 7:
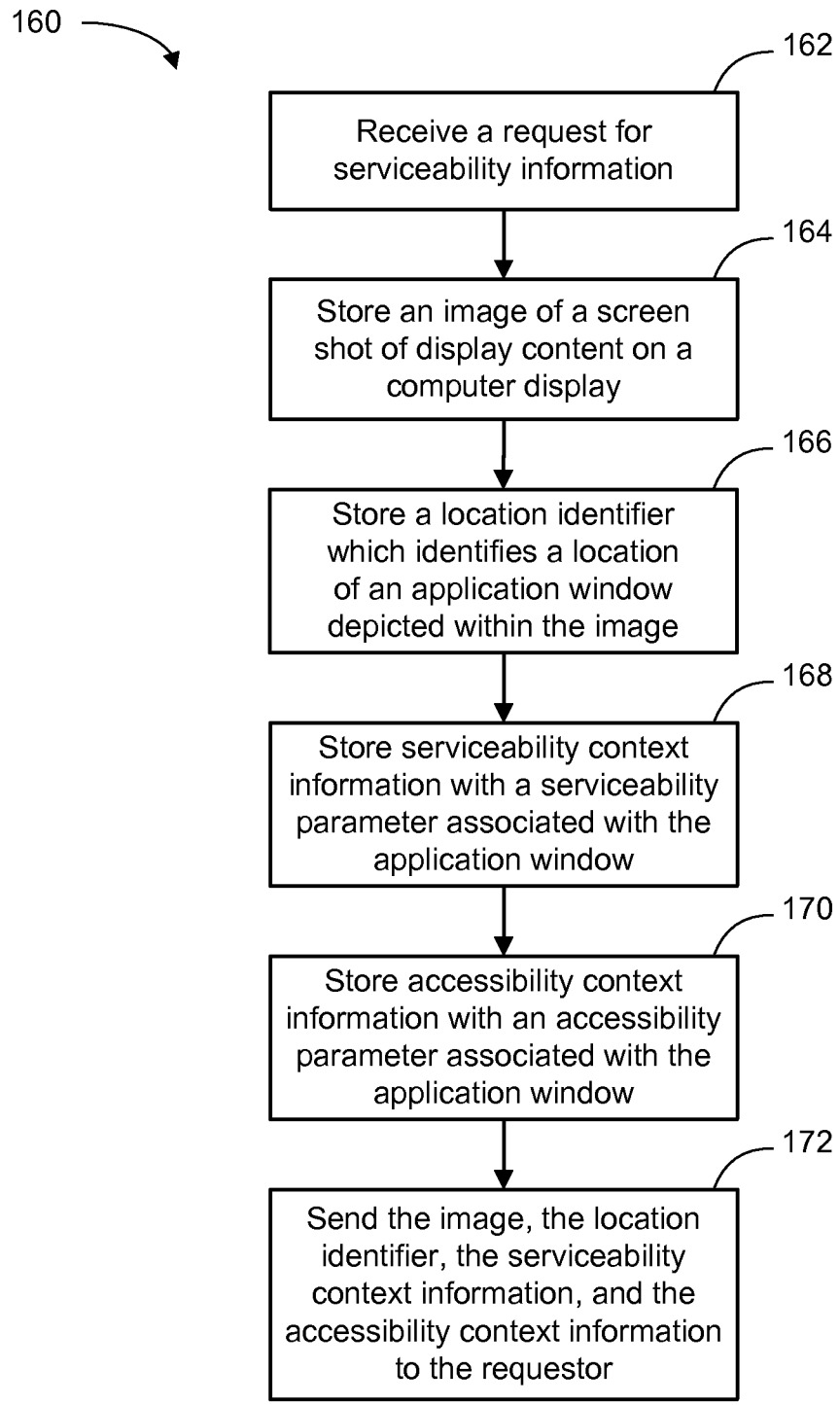
FIG. 7 depicts a schematic flow chart diagram of one embodiment of a method for capturing accessibility information.

FIG. 7 depicts a schematic flow chart diagram of one embodiment of a method 160 for capturing accessibility information. Although the method 160 is described in conjunction with the client computer 102 of FIG. 2 and the communication system 100 of FIG. 1, embodiments of the method 160 may be implemented with other types of client computers and/or communication systems.

In the illustrated method 160, the client computer 102 receives 162 a request for serviceability information. The request may be initiated by support personnel in a remote location relative to the client computer 102. Also, the request may be sent through asynchronous communications that do not necessarily depend on having the client computer 102 online at the same time as a support computer 104. Other embodiments of the method 160 may omit the operation of receiving the request, in which case capturing the serviceability information may be initiated at the client computer 102, for example, by a user or an administrative monitoring program.

In response to initiation of the capture process, the client computer 102 stores 164 an image 120 of a screen shot of display content on the computer display 114. As described above, the image 120 may be stored in the data storage device 112. The client computer 102 also stores 166 a location identifier which identifies a location of an application window depicted within the image 120. As mentioned above, the location identifier may be included in the application context 122 for the application window. The client computer 102 also stores 168 serviceability context information 126 with at least one serviceability parameter associated with the application window. The client computer 102 also stores 170 accessibility context information 124 with at least one accessibility parameter associated with the application window. The client computer 102 then sends 172 the image 120, the location identifier, the serviceability context information 126, and the accessibility context information 124 to a remote computer such as the support computer 104. The depicted method 160 then ends.

Figure 8:
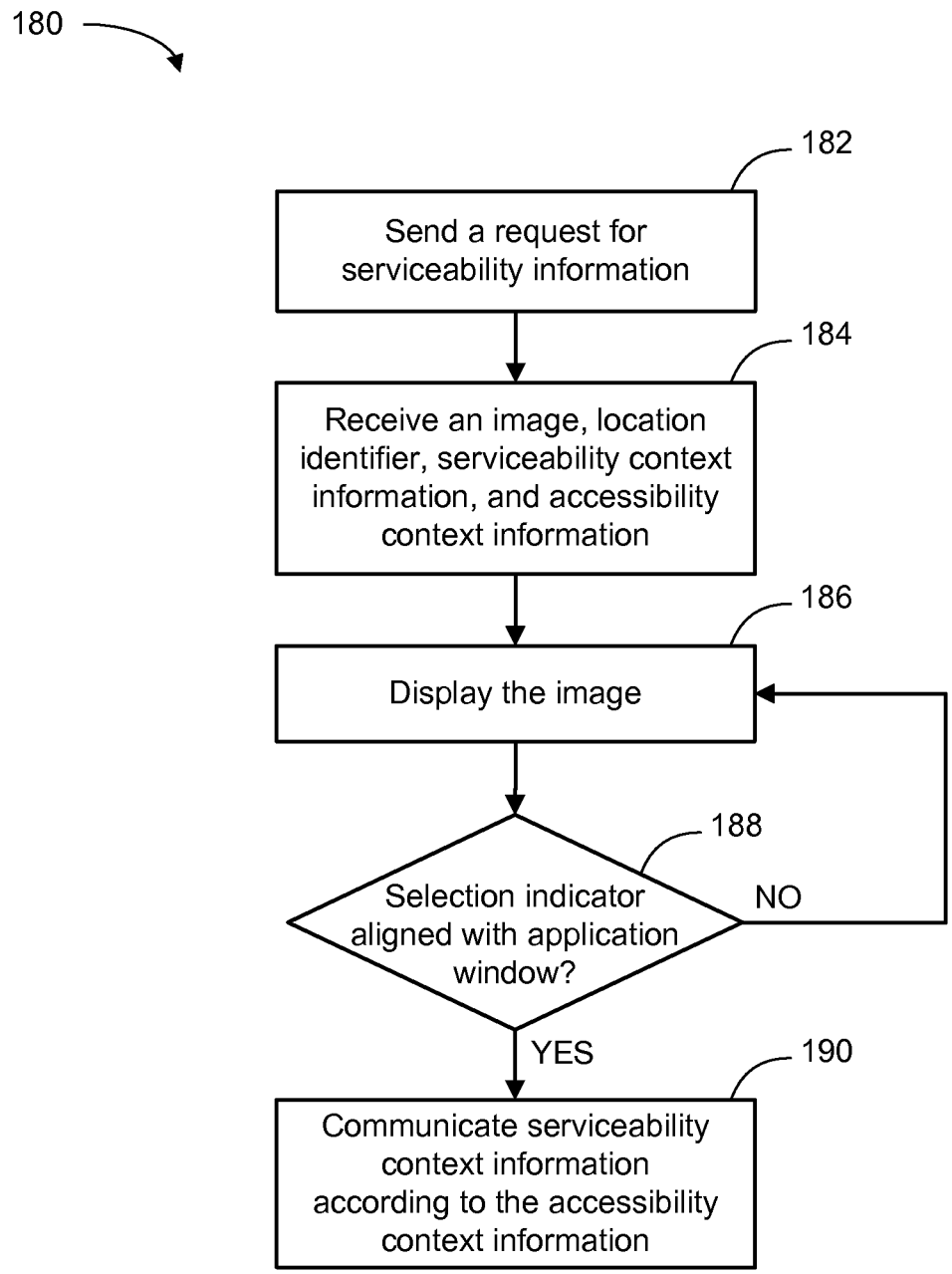
FIG. 8 depicts a schematic flow chart diagram of one embodiment of a method for communicating serviceability information according to accessibility information.

FIG. 8 depicts a schematic flow chart diagram of one embodiment of a method 180 for communicating serviceability information according to accessibility information. Although the method 180 is described in conjunction with the support computer 104 and the communication system 100 of FIG. 1, embodiments of the method 180 may be implemented with other types of support computers and/or communication systems.

In the illustrated method 180, a requestor sends 182 a request for serviceability information. The request may be initiated by support personnel that are trying to help a customer with a technical support issue. In an alternative embodiment, the method 180 may omit the operation of sending a request.

In response to initiation of the servicing process, the support computer 104 receives the image 120, the location identifier, the serviceability context information 126, and the accessibility context information 124 from the client computer 102. The support computer 104 uses this information to display the image 120 in the display window 140, as described above with reference to FIG. 5. The support computer 104 determines 188 if the selection indicator 148 is aligned with one or more application windows within the image 120 and, if so, communicates 190 serviceability context information 126 to the user according to the accessibility context information 124 provided by the client computer 102. The depicted method 180 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of a combination of hardware and software elements. In one embodiment, the invention is implemented in an electronic storage device containing software, which includes but is not limited to firmware, resident software, microcode, etc. Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain or store the program for use by or in connection with the instruction execution system, apparatus, or device. Further, the computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In a specific embodiment, the computer program product includes a computer useable storage medium to store a computer readable program that, when executed on a computer, causes the computer to implement capturing accessibility information, as described herein. In some embodiments, the accessibility information may be sent to a remote user for remote technical support diagnostics. The computer readable program, when executed on a computer, causes the computer to perform operations. The operations include storing an image within a data storage device. The image includes a screen shot of display content on a computer display. The operations also include storing a location identifier within the data storage device in connection with the image. The location identifier identifies a location of an application window depicted within the image. The operations also include storing accessibility context information within the data storage device in connection with the image. The accessibility context information describes an accessibility parameter associated with the application window depicted within the image.

In another embodiment, the computer readable program causes the computer to implement communicating serviceability information according to accessibility information. In this embodiment, the operations include displaying an image on a computer display. The image includes a screen shot of display content from a remote computer display. The operations also include identifying a selection indicator relative to the image of the display content from the remote computer display. The operations also include communicating accessibility context information to a user based on the location of the selection indicator relative to the image of the display content from the remote computer display. The accessibility context information includes an accessibility parameter associated with an application window depicted within the image of the display content from the remote computer display.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for capturing accessibility information, wherein the computer readable program, when executed on a computer, causes the computer to perform operations comprising:
   capturing a screen shot image of display content on a computer display and storing the image within a data storage device along with
   a location identifier that identifies a location of an application window of an application of a computer, the application window depicted within the image;
   capturing serviceability context information of the application in response to capturing the screen shot image and storing the serviceability context information within the data storage device in connection with the image, wherein the serviceability context information describes a serviceability parameter associated with the application window; and
   capturing accessibility context information of the serviceability context information and of the application window in response to the capturing the serviceability context information and storing the accessibility context information within the data storage device in connection with the image, wherein the captured accessibility context information of the serviceability context information functions to communicate the serviceability context information to a user, and wherein the accessibility context information of the application window functions to communicate data of the application window, wherein the accessibility context information is distinct from the location identifier, wherein the accessibility context information describes an accessibility parameter associated with the application window depicted within the image, and wherein the accessibility context information conveys the serviceability context information to a user according to the accessibility parameter.

2. The computer program product of claim 1, wherein the accessibility context information comprises information associated with the application window for communication to a person with a physical disability, and wherein the operations further comprise combining the serviceability context information and the accessibility context information and storing the serviceability context information and the accessibility context information in a single data structure.

3. The computer program product of claim 1, wherein the serviceability context information comprises information associated with the application window for resource allocation of a computing resource.

4. The computer program product of claim 1, wherein the serviceability parameter of the serviceability context information comprises a memory usage indicator and a processor usage indicator.

5. The computer program product of claim 1, wherein the computer readable program, when executed on the computer, causes the computer to perform further operations comprising storing the accessibility context information and the serviceability context information associated with the application window in a combined data structure within the data storage device.

6. The computer program product of claim 5, wherein the computer readable program, when executed on the computer, causes the computer to perform further operations comprising storing the accessibility context information and the serviceability context information associated with the application window in a metadata field of the image of the display content.

7. The computer program product of claim 1, wherein the computer readable program, when executed on the computer, causes the computer to perform further operations comprising:
receiving a request from a remotely located technical service provider for the image of the display content; and
sending the image and the accessibility context information to the technical service provider in response to the request.

8. An apparatus comprising:
a computer display to display an application window for an application program;
a data storage device coupled to the computer display, wherein the data storage device is configured to store:
an image of a screen shot of display content on the computer display, wherein the display content comprises the application window;
serviceability context information associated with the image, wherein the serviceability context information describes a serviceability parameter associated with the application program; and
accessibility context information associated with the serviceability context information and accessibility context information associated with the application window in a single data structure, wherein the accessibility context information associated with the serviceability context information functions to communicate the serviceability context information to a user, and wherein the accessibility context information of the application window functions to communicate data of the application window wherein the accessibility context information describes an accessibility parameter associated with the application window depicted within the image, wherein the accessibility context information conveys the serviceability context information to a user according to the accessibility parameter; and
a communication interface coupled to the data storage device, wherein the communication interface is configured to transmit the image and the associated accessibility context information to a remote user in response to a request from the remote user.

9. The apparatus of claim 8, wherein the data storage device is further configured to store:
a location identifier associated with the application window depicted within the image, wherein the location identifier identifies a location of the application window depicted within the image, and wherein the accessibility context information is distinct from the location identifier.

10. A method comprising:
capturing a screen shot image of display content on a computer display and storing the image within a data storage device along with
a location identifier that identifies a location of an application window of an application of a computer, the application window depicted within the image;
capturing serviceability context information of the application in response to capturing the screen shot image and storing the serviceability context information within the data storage device in connection with the image, wherein the serviceability context information describes a serviceability parameter associated with the application window; and
capturing accessibility context information of the serviceability context information and of the application window in response to the capturing the serviceability context information and storing the accessibility context information within the data storage device in connection with the image, wherein the captured accessibility context information of the serviceability context information functions to communicate the serviceability context information to a user, and wherein the accessibility context information of the application window functions to communicate data of the application window, wherein the accessibility context information is distinct from the location identifier, wherein the accessibility context information describes an accessibility parameter associated with the application window depicted within the image, and wherein the accessibility context information conveys the serviceability context information to a user according to the accessibility parameter; and
communicating the image and the location identifier, the accessibility context information, and the serviceability information associated with the application window depicted in the image to a remote user in response to a technical support communication from the remote user.

* * * * *